8550X
Grover & Lanton,
Planing and Matching Machine.
Patented Dec. 23, 1834.
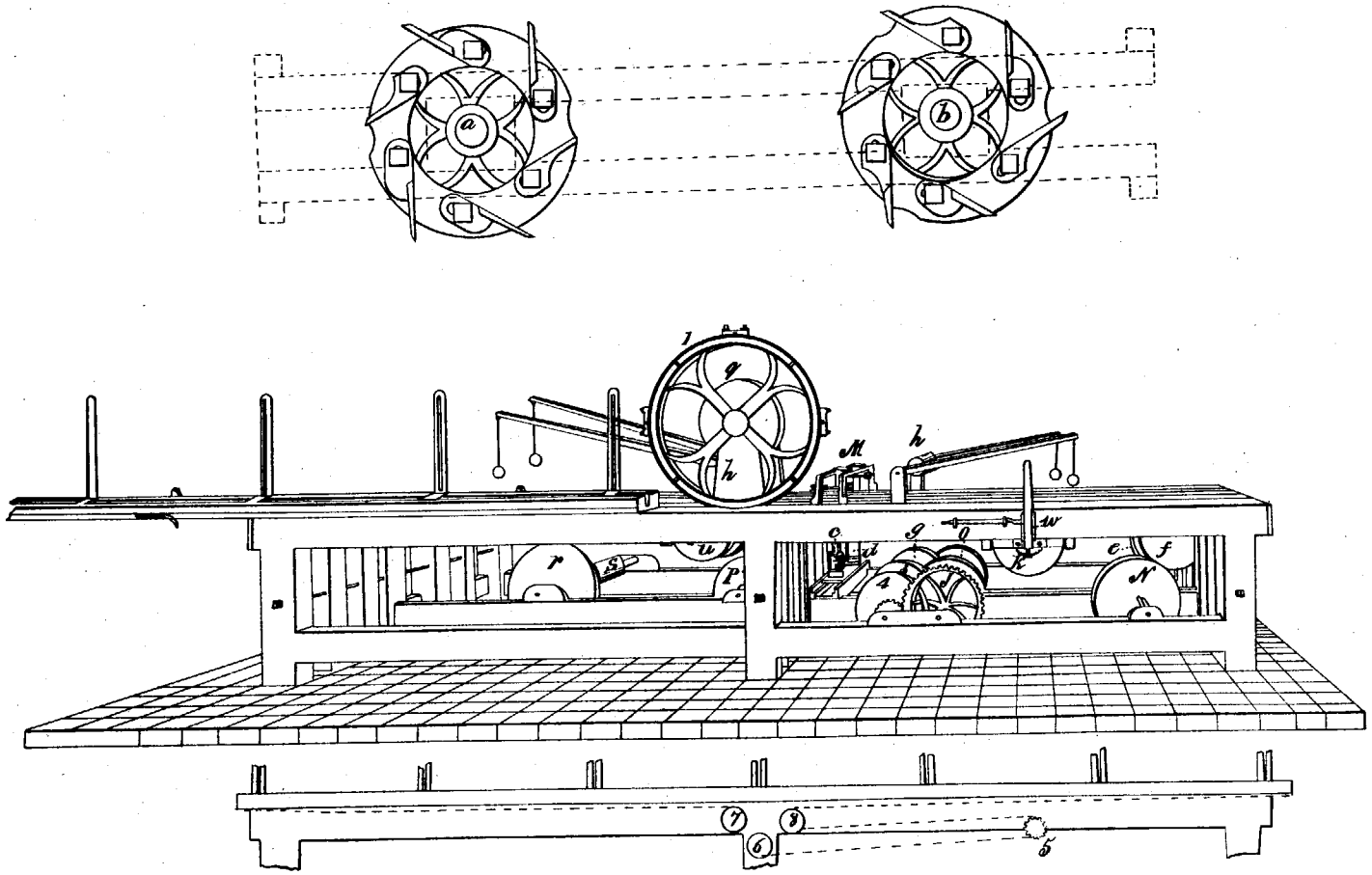
AM. PHOTO-LITHO. CO. N.Y. (OSBORNE'S PROCESS)

Zadock B. Grover & David Lawton, Springwater N. Y.
Patent issued December 23, 1834.

The Schedule referred to in these Letters Patent and making part of the same containing a description in the words of the said Zadock B. Grover and David Lawton themselves of their Improvement in a Machine for planing and matching boards.

To all to whom these presents shall come

Be it known that we, Zadock B. Grover & David Lawton of the Town of Springwater County of Livingston and State of New York have invented a new & useful Improvement for planeing and matching boards denominated a Planeing & Matching Machine: and that the following is a full & exact description of the construction and operation of the said machine as invented by us.

The principal executioners are three wheels. One denominated the planeing wheel and two the matching or tonguing & grooving wheels. The planeing wheel has attached to its outer edge or rim, four hooked knives equidistant from each other, and fastened by plates screwed upon them. These knives operate before the planes to rough hew and equalize the thickness of the board. Between and immediately within the sweep of these knives and at equal distance from each, are four [illegible] irons placed in throats, so as to bring them in contact [illegible] the board to be planed, at the side of the wheel. These [illegible] are fastened to the oblique sides of the throats with screws which are moved in slots, as occasion requires, for the purpose of bringing them upon a plane with a circular prominence immediately within their sweep. Another form of applying the planes to the wheel, is as follows. The plane irons are placed in grooves between two circular rims, adjusted by sliding them in the grooves to the proper contact with the board to be planed and fastened with screws to that position. Their front stands at an obtuse angle, with the rear to equalize the thickness of the board, and smooth it at the same time. This wheel runs vertically. The board to be planed, is adjusted to the planes by placing it upon a carriage consisting of two parts; – a bed piece, in the under side of which is a groove fitted to a tongue upon the frame to regulate its motion back & forth: – a top piece to which the board is immediately attached, is moveable in a direction transverse to that of the bed piece, so as to adjust the carriage to suit the thickness of the board to be planed. When so adjusted the top piece is screwed to the bed piece, and the board is put upon the carriage by placing its lower edge upon a part of the bed piece which projects beyond the top piece – and sustained by 6 uprights of the top piece and there fastened to its position by six spiked dogs in its upper edge. These dogs are moveable up and down in slots of the said uprights and fastened with screws to them after being spiked to the board. The manner of moving the carriage back and forth, is by a chain fastened to each end of it. the links of which are fitted to the cogs of a cog wheel, which is upon a shaft which is alternately made the shaft of two whirrs, by varying their position, which is done by a lever attached to the side of the frame, and connected by a joint at its lower end to a rod, which is an appendage of a small frame, having two side & two end pieces through these end pieces the shaft passes, so that when the top of the lever is pressed towards the carriage it draws the said small frame & with it one whirr along the shaft. This whirr is geared by a strap passing over it, and around another smale whurr upon the shaft of which is the shaft of a larger whurr, which is in like manner geared to a whurr upon the shaft of a cog-wheel, which gears it to the main shaft:— when therefore, that is set in motion, the plane wheel is plied, and the carriage according to this adjust-ment passes gradually by its side bringing the side of the board in such contact with the edges of the knives & planes as to smooth it from end to end, as it thus passes. By pulling the top of the lever from the carriage, and thereby sliding the said small frame back to its first mentioned position the pined whurr now in action is thrown out of gear and the other pinied whurr, which has a contrary and quick motion, is in like manner, by the sliding of the said small frame, simultaneously thrown into gear giving the carriage a quick motion back The matching Wheels have a horizontal motion. The tongueing wheel has set in its edge equidistant from each other four tongueing planes, and two small planes diametrically opposite each other to joint the tongue. The grooving wheel has set in its edge equidistant from each other, four grooving planes, and four planes to joint the edge of the board. The shafts of these mashing wheels turn in boxes at their upper & lower ends — the lower boxes are fitted to slide in a groove — the upper ones are fitted to slide between, and by their shoulders upon two bars. Through the lower part of the lower boxes passes a rod. And in like manner also, a rod through the upper part of the upper boxes. These rods have contrary screws cut upon those parts of them that pass through the boxes, and the boxes are screw-nuts adapted to them. Upon the outer ends of these two rods, are cog-wheels of like diameters and like number of cogs:— between these two cog-wheels, and mashing into each is another or middle cog wheel upon the shaft of which is a crank which therefore when turned in
one direction brings the matching wheels nearer together and
when turned in the other direction removes them farther asunder.
This is to adjust the wheels to the width of the board to be
matched. These matching wheels are plied by straps which
pass around whurrs upon the lower parts of their shafts,
thence around drums, upon the shaft of, and between which
is a whurr which is geared by a strap to the main shaft.
The board to be matched, is placed upon the carriage dogged
down at each end and stayed more firmly to the carriage
by passing under two rollers situated near, and on each
side of the matching wheels and borne down upon the board
by weighted levers, which are attached by joints to upright
appendages of the main frame. The process of moving this
carriage is the same as that described of the carriage of the
planeing apparatus.

References to Drawings — No 1 planeing wheel —
h. h rollers with their weighted levers to hold the board firm
to the carriage while matching — The machinery is geared
by straps as follows — Whurr 2. to Whurr 3 — Whurr 4 to a drum
under the floor, not represented in the draught which puts the
whole machinery in motion. Whurr I to whurr k runs the
carriage back — a small whurr, unseen, upon the shaft of I
to whurr N, — small whurr, unseen on the shaft of N, to whurr,
unseen, on the shaft of k, which has a motion contrary to that
of k, to move the carriage forward while planeing — Whurr o.
to drum p, — drum p. to whurr u, runs the matching carri-
age back — a small whurr, unseen on the shaft of drum p.
to whurr, r — Whurr, s, to whurr, t, runs the matching carriage
through, while matching — Whurr G, to a small whurr, unseen,
between whurrs e, and f to C and D. give motion to the matching
wheels — M. matching wheels & their appurtenances, to adjust them to the width of board to be matched — w. lever which changes the position of the whirls which move the carriage back and forth.

Witnesses

Thomas C. Grover } Zadock B. Grover
Rufus G. Clark } David Lawton

Exa. & S.

(Recorded anew May 6, 1851)

1660